(12) United States Patent
Yamamoto et al.

(10) Patent No.: US 8,358,567 B2
(45) Date of Patent: Jan. 22, 2013

(54) INFORMATION REPRODUCTION DEVICE AND INFORMATION REPRODUCTION METHOD

(75) Inventors: Yoshikazu Yamamoto, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/576,260

(22) PCT Filed: Feb. 2, 2011

(86) PCT No.: PCT/JP2011/000562
§ 371 (c)(1),
(2), (4) Date: Jul. 31, 2012

(87) PCT Pub. No.: WO2011/096201
PCT Pub. Date: Aug. 11, 2011

(65) Prior Publication Data
US 2012/0300607 A1    Nov. 29, 2012

(30) Foreign Application Priority Data

Feb. 4, 2010    (JP) ................................ 2010-022937

(51) Int. Cl.
*G11B 7/00*    (2006.01)
(52) U.S. Cl. ................. 369/53.17; 369/53.2; 369/53.22; 369/47.21; 369/53.45
(58) Field of Classification Search ........................ None
See application file for complete search history.

(56) References Cited

U.S. PATENT DOCUMENTS

| 7,990,825 | B2 * | 8/2011 | Nakamura ................. 369/53.17 |
| 2002/0049883 | A1 | 4/2002 | Schneider et al. |
| 2005/0270944 | A1 | 12/2005 | Yoshida et al. |
| 2006/0126470 | A1 | 6/2006 | Hoshizawa |
| 2006/0239161 | A1 | 10/2006 | Takahashi et al. |
| 2009/0028016 | A1 | 1/2009 | Hayasaka |

FOREIGN PATENT DOCUMENTS

| JP | 2004-504645 T | 2/2004 |
| JP | 2005-322337 A | 11/2005 |
| JP | 2006-172528 A | 6/2006 |
| JP | 2008-282532 A | 11/2008 |
| JP | 2009-032339 A | 2/2009 |
| WO | 99/12101 | 3/1999 |

OTHER PUBLICATIONS

International Search Report for corresponding International Application No. PCT/JP2011/000562 mailed May 10, 2011.
Form PCT/USA/237 for corresponding International Application No. PCT/JP2011/000562 dated May 10, 2011 and partial English translation.
Information Technology—SCSI-Multi-Media Commands-6 4.15, pp. 113-130, Oct. 2009.

* cited by examiner

*Primary Examiner* — Muhammad N Edun
(74) *Attorney, Agent, or Firm* — Renner, Otto, Boisselle & Sklar, LLP

(57) ABSTRACT

According to the present invention, an information reproduction device and an information reproduction method are provided, which are capable of reproducing data using temporary management information that is identified by a simple way of specification. In the present invention, the control receives temporary management information identifying information, searches for and reproduces the most suitable one of a plurality of temporary management information, and reproduces data using the temporary management information. Thus, it is possible to obtain contents of an overwritten file as of before the file was overwritten.

6 Claims, 11 Drawing Sheets

| TDDS |
|---|
| CONTENTS |
| TDDS IDENTIFIER |
| : |
| INCONSISTENCY FLAG |
| : |
| NEXT AVAILABLE BLOCK ADDRESS IN LAYER 0 INNER OPC AREA |
| NEXT AVAILABLE BLOCK ADDRESS IN LAYER 1 INNER OPC AREA |
| : |
| NEXT AVAILABLE BLOCK ADDRESS IN LAYER 0 OUTER OPC AREA |
| NEXT AVAILABLE BLOCK ADDRESS IN LAYER 1 OUTER OPC AREA |
| : |
| RECORDING DATE |
| DEVICE UNIQUE IDENTIFICATION INFORMATION |

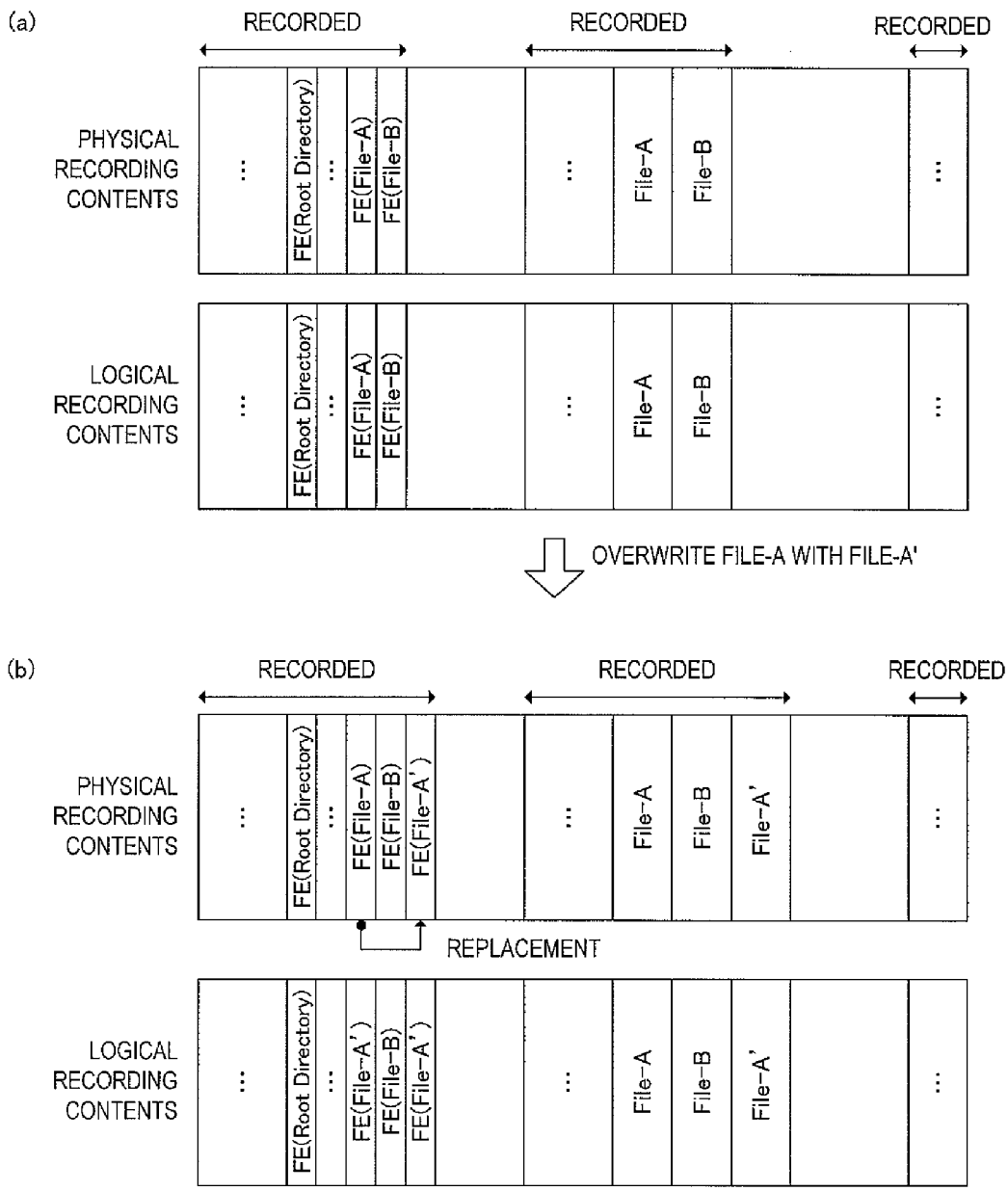

INFORMATION REPRODUCTION DEVICE AND INFORMATION REPRODUCTION METHOD

TECHNICAL FIELD

The present invention relates to an information reproduction device and an information reproduction method for reproducing an information recording medium for which logical overwrite is employed, and an information recording/reproduction device and an information recording/reproduction method for recording/reproducing an information recording medium for which logical overwrite is employed.

BACKGROUND ART

In recent years, rewritable optical discs and write-once optical discs having large capacities such as BD-REs (Blu-ray Disc Rewritable) and BD-Rs (Blu-ray Disc Recordable) have been widespread. With BDs, a defect management system is employed also for BD-Rs, which are write-once optical discs, and the data recording reliability is ensured by replacing defect blocks with spare areas provided along the inner periphery and the outer periphery. Moreover, upon receipt of a data recording request to an already recorded area, the area is replaced with an unrecorded portion of a user data area, realizing logical overwrite (or pseudo overwrite).

A logical structure of a double-layer BD-R is shown in FIG. 13 (see Non-Patent Document No. 1). In a BD-R, user data areas for recording user data, spare areas for replacing defect blocks of user data areas, and a DMA (Disc Management Area) and a TDMA (Temporary Disc Management Area) for recording disc management information are allocated. Note that a TDMA is referred to also as a temporary management information area.

Disc management information is recorded in a TDMA until the disc is finalized, and is recorded in a DMA when the disc is finalized.

As shown in FIG. 14, in a TDMA, a plurality of TDMSs (Temporary Disc Management Structure) are recorded one at a time (see Patent Document No. 1). Where the recording mode of the disc is the sequential recording mode, a TDMS includes a TDFL (Temporary Defect List), an SRRI (Sequential Recording Range Information), and a TDDS (Temporary Disc Definition Structure). TDFL is used mainly as a defect list for managing replacement areas for defect areas on the disc. SRRI mainly includes management information on a recording area called SRR (Sequential Recording Range). TDDS includes definition structure information of the disc such as the arrangement information of TDFL and SRRI and the capacity of the spare area. Note that TDMS is referred to also as temporary management information, and TDFL is referred to also as a (temporary) defect list.

The operation of logical overwrite will be described using FIG. 15. When overwriting data A' in block P when there is data A recorded in block P, data A' is recorded in block Q at the beginning of the unrecorded area, and a TDMS is additionally recorded in the TDMA wherein the TDMS includes, as a TDFL, a defect list to which an entry is added indicating that block P has been replaced with block Q. Then, upon receipt of a reproduction request for block P, the control refers to the defect list to confirm that block P has been replaced with block Q, and accordingly reproduces block Q to obtain data A'. Thus, logical overwrite is realized through replacements using a defect list.

With such logical overwrite, when a file is overwritten, the contents thereof as of before the file is overwritten can no longer be obtained, which will now be described using FIG. 16. In FIG. 16, each FE (File Entry) is meta data including attributes of a file, the position at which the contents of the file are recorded, the size of the file, etc. Physically recorded contents are the contents actually recorded on the disc, and logically recorded contents are the contents that reflect the results of logical overwrite and that can be referred to from outside the information recording/reproduction device. Where File-A and File-B are recorded as shown in FIG. 16(a), when File-A is overwritten with File-A' as shown in FIG. 16(b), the contents of File-A' are recorded in an unrecorded area, after which FE of File-A is logically overwritten with FE of File-A'. As a result, as shown in FIG. 16(b), it is no longer possible to refer to FE of File-A from outside the information recording/reproduction device, whereby the position at which the contents of File-A are recorded and the size of File-A become unknown, and it is therefore no longer possible to obtain the contents of File-A.

In contrast, Patent Document No. 2 discloses a method for obtaining contents before an overwrite where a file has been overwritten. Patent Document No. 2 is directed to a configuration where a DDS (TDDS) includes a restoration DLT (TDFL) address, wherein the past state is restored by bringing it back to the previous DLT (TDFL) based on the restoration DLT (TDFL) address.

CITATION LIST

Patent Literature

Patent Document No. 1: Japanese Laid-Open Patent Publication No. 2008-282532
Patent Document No. 2: Japanese Laid-Open Patent Publication No. 2006-172528

Non-Patent Literature

Non-Patent Document No. 1: INFORMATION TECHNOLOGY—Multi-Media Commands-6 4.15

SUMMARY OF INVENTION

Technical Problem

The above method disclosed in Patent Document No. 2 is a method for going back from a TDMS to the preceding TDMS. Therefore, it is not possible to selectively use a useful TDMS, e.g., to use a TDMS at a point in time in the past when the information recording medium was removed from the information recording/reproduction device, or to use a TDMS immediately before a particular block is logically overwritten.

The present invention has been made in view of the above, and an object thereof is to provide an information reproduction device and an information reproduction method with which it is possible to selectively use a useful TDMS by a simple way of specification.

Solution to Problem

An information reproduction device of the present invention is an information reproduction device for reproducing information from a write-once information recording medium, the write-once information recording medium including: a user data area for recording user data; and a temporary management information area for recording temporary management information, wherein: the temporary management information includes recording date information regarding a date on which the temporary management information was recorded; and where logical overwrite is employed for the write-once information recording medium and a plurality of temporary management information are recorded in the temporary management information area, the information reproduction device: receives date identifying information with which it is possible to identify a date from outside the information reproduction device; reproduces, from the temporary management information area, a latest one of at least one temporary management information including recording date information indicating a date that coincides with, or is prior to, the date indicated by the date identifying information; and reproduces data of the user data area in accordance with the reproduced temporary management information.

In one embodiment, the information reproduction device includes a recording section for recording information on the write-once information recording medium; and recording on the write-once information recording medium is prohibited when the reproduced temporary management information is not latest temporary management information recorded in the temporary management information area.

An information reproduction device of the present invention is an information reproduction device for reproducing information from a write-once information recording medium, the write-once information recording medium including: a user data area for recording user data; and a temporary management information area for recording temporary management information, wherein a previous location address is recorded, along with user data, in each block of the user data area; the temporary management information includes a defect list including a replacement entry; and where logical overwrite is employed for the write-once information recording medium and a plurality of temporary management information are recorded in the temporary management information area, the information reproduction device: receives information with which it is possible to identify an address of a logical overwrite target block and information with which it is possible to identify the retroactive logical overwrite count from outside the information reproduction device; refers to a replacement entry included in the defect list of a latest one of the plurality of temporary management information to identify a replacing block with which the logical overwrite target block has been replaced, and sets the replacing block as a current block; identifies a target current block by repeating, a number of times equal to the retroactive logical overwrite count, an operation of reproducing a previous location address recorded in the current block and setting a block indicated by the previous location address as a new current block; searches for and reproduces a latest one of at least one temporary management information including a defect list including a replacement entry that indicates a replacement of the logical overwrite target block with the target current block; and reproduces data of the user data area in accordance with the reproduced temporary management information.

In one embodiment, the information reproduction device includes a recording section for recording information on the write-once information recording medium; and recording on the write-once information recording medium is prohibited when the reproduced temporary management information is not latest temporary management information recorded in the temporary management information area.

An information reproduction method of the present invention is an information reproduction method for reproducing information from a write-once information recording medium, the write-once information recording medium including: a user data area for recording user data; and a temporary management information area for recording temporary management information, wherein: the temporary management information includes recording date information regarding a date on which the temporary management information was recorded; and where logical overwrite is employed for the write-once information recording medium and a plurality of temporary management information are recorded in the temporary management information area, the information reproduction method includes the steps of: receiving date identifying information with which it is possible to identify a date from outside an information reproduction device; reproducing, from the temporary management information area, a latest one of at least one temporary management information including recording date information indicating a date that coincides with, or is prior to, the date indicated by the date identifying information; and reproducing data of the user data area in accordance with the reproduced temporary management information.

An information reproduction method of the present invention is an information reproduction method for reproducing information from a write-once information recording medium, the write-once information recording medium including: a user data area for recording user data; and a temporary management information area for recording temporary management information, wherein: a previous location address is recorded, along with user data, in each block of the user data area; the temporary management information includes a defect list including a replacement entry; and where logical overwrite is employed for the write-once information recording medium and a plurality of temporary management information are recorded in the temporary management information area, the information reproduction method includes the steps of: receiving information with which it is possible to identify an address of a logical overwrite target block and information with which it is possible to identify the retroactive logical overwrite count from outside an information reproduction device; referring to a replacement entry included in the defect list of a latest one of the plurality of temporary management information to identify a replacing block with which the logical overwrite target block has been replaced, and setting the replacing block as a current block; identifying a target current block by repeating, a number of times equal to the retroactive logical overwrite count, an operation of reproducing a previous location address recorded in the current block and setting a block indicated by the previous location address as a new current block; searching for and reproducing a latest one of at least one temporary management information including a defect list including a replacement entry that indicates a replacement of the logical overwrite target block with the target current block; and reproducing data of the user data area in accordance with the reproduced temporary management information.

Advantageous Effects of Invention

According to the present invention, data is reproduced from a write-once information recording medium for which logical overwrite is employed, using temporary management information specified by temporary management information identifying information. Thus, it is possible to reproduce data while switching between different temporary management information to be used by a simple way of specification, and it is possible to extract contents of a file that has been logically overwritten as of before the file was overwritten.

Then, it is possible to selectively employ temporary management information for which an inconsistency flag is cleared, whereby it is possible to specify an inconsistency flag clearing count as the temporary management information identifying information.

Alternatively, it is possible to selectively employ temporary management information as of when the block next available in the OPC area changes, whereby it is possible to specify the number of times the information recording medium has been ejected as the temporary management information identifying information.

Alternatively, it is possible to selectively employ temporary management information as of when the device unique information changes, whereby it is possible to specify the number of times the information recording/reproduction device has been exchanged as the temporary management information identifying information.

Alternatively, it is possible to employ the latest one of temporary management information for which the date on which the temporary management information was recorded is a specified date or a date prior to the specified date, whereby it is possible to specify a date as the temporary management information identifying information.

Alternatively, it is possible to go through previous location addresses to calculate a replacement entry included in the temporary management information as of before a specified block was logically overwritten a specified number of times, and to employ the latest temporary management information including that replacement entry, whereby it is possible to specify the address and the logical overwrite count of the logical overwrite target block as the temporary management information identifying information.

BRIEF DESCRIPTION OF DRAWINGS

FIG. 16(a) and (b) are diagrams showing an example of an overwrite of a file by logical overwrite.

DESCRIPTION OF EMBODIMENTS

Embodiments of the present invention will now be described with reference to the drawings.

Figure 1:
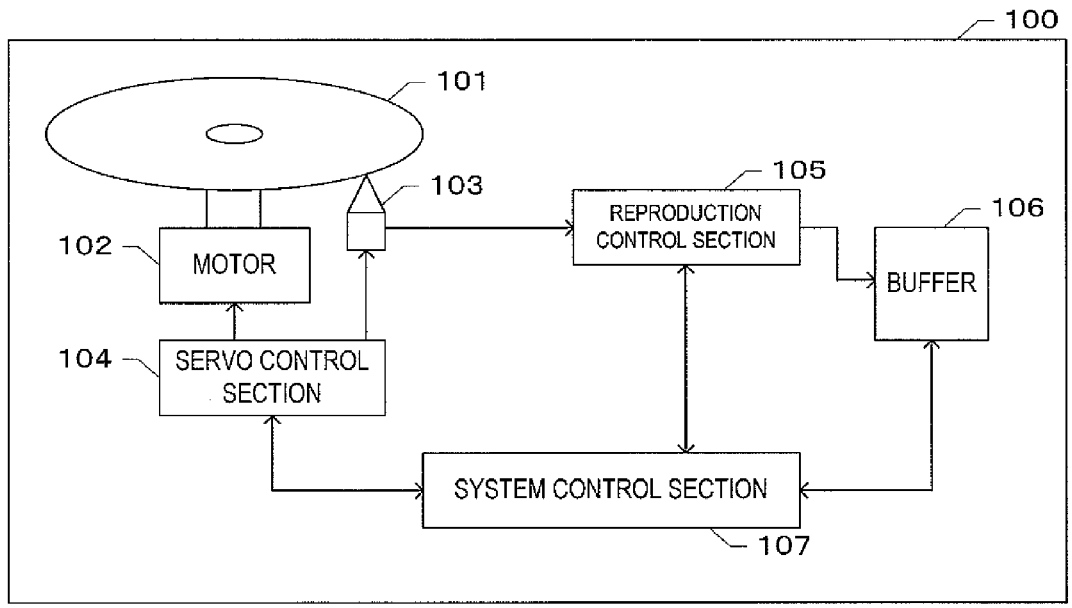
FIG. 1 A diagram showing a configuration of an information reproduction device according to an embodiment of the present invention.

FIG. 1 is a block diagram showing an information reproduction device 100 according to an embodiment of the present invention.

In FIG. 1, a disc motor 102 spins an information recording medium 101. An optical head 103 irradiates a recording layer of the information recording medium 101 with a laser spot to reproduce data of the information recording medium 101. A servo control section 104 performs the laser spot tracking process by moving the optical head 103 to the target track while controlling the spin of the disc motor 102. A reproduction control section 105 demodulates the reproduce signal detected by the optical head 103 to extract reproduce data therefrom, and stores the reproduce data in a buffer 106. A system control section 107 performs an overall control of the information reproduction device 100.

The information recording medium 101 is a write-once information recording medium, e.g., a BD-R. The present embodiment is directed to a case where a BD-R is used as the information recording medium.

Figure 2:
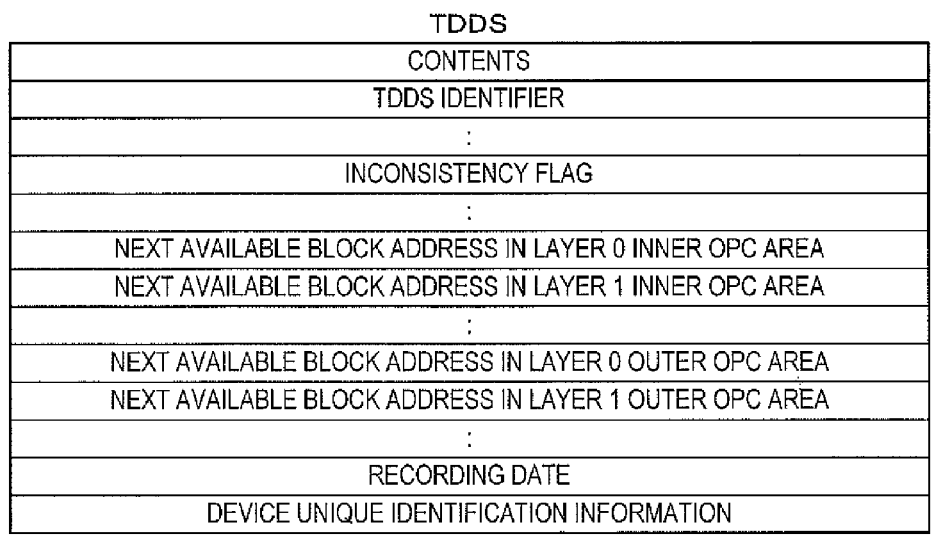
FIG. 2 A diagram showing a structure of a TDDS of a double-layer BD-R according to an embodiment of the present invention.

A portion of the structure of a TDDS of a double-layer BD-R is shown in FIG. 2.

The TDDS identifier in FIG. 2 is an identifier that indicates that this structure is a TDDS, and it is possible to identify the current and past TDDS recording positions by searching for the TDDS identifier.

The inconsistency flag in FIG. 2 is a collection of bits each indicating whether each element of the TDMS to which this TDDS belongs is of the latest state, wherein a cleared bit indicates the latest state. Examples of elements of the TDMS for which the inconsistency flag indicates whether they are of the latest state include TDFL, SRRI excluding LRA (Last Recorded Address), and LRA in SRRI. Before the information recording medium is ejected from the information recording/reproduction device, TDFL, SRRI, etc., are updated as necessary, and the corresponding bits of the inconsistency flag are cleared. Note that to clear a predetermined bit of the inconsistency flag means as follows. That is, when a predetermined bit of the inconsistency flag included in a TDDS is "1", and the TDDS is thereafter updated, "0" is recorded as the predetermined bit of the inconsistency flag.

The next available block address in the layer 0 inner periphery OPC area and the next available block address in the layer 1 inner periphery OPC area in FIG. 2 are each an address that is next available in the OPC area arranged along the inner periphery of the information recording medium. The OPC area is an area used for trial write operations performed for the adjustment of the recording power and the recording waveform.

The next available block address in the layer 0 outer periphery OPC area and the next available block address in the layer 1 outer periphery OPC area in FIG. 2 are each an address that is next available in the OPC area arranged along the outer periphery of the information recording medium.

The recording date in FIG. 2 is recording date information regarding the date on which the TDDS was recorded. For example, year/month/day on which the TDDS was recorded is stored as the recording date information. The recording date information may further indicate the time at which the TDDS was recorded.

The device unique identification information in FIG. 2 is device unique information for identifying an information recording/reproduction device that recorded the TDDS.

Figure 3:
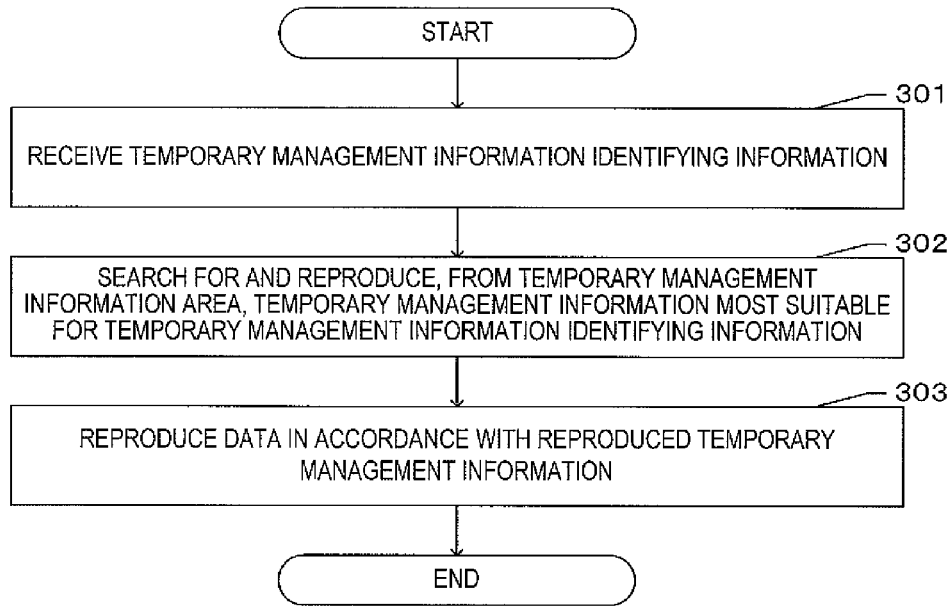
FIG. 3 A flow chart showing an operation of an information reproduction device according to an embodiment of the present invention.

The operation of the information reproduction device 100 in the present embodiment will be described with reference to the flow chart of FIG. 3.

In step 301, information for identifying the temporary management information (TDMS) to be used is received from outside the information reproduction device 100 (e.g., the user). The "temporary management information to be used" is the temporary management information with which the target user data (the user data before being overwritten) was managed, and the target user data can be reproduced by using the temporary management information.

In step 302, the control searches for the most suitable temporary management information for identifying the temporary management information received in step 301 through the temporary management information area (TDMA), and reproduces the temporary management information.

In step 303, data reproduction of the information recording medium 101 is performed in accordance with the temporary management information reproduced in step 302.

The following description of embodiments is directed to specific examples of information for identifying the temporary management information received in step 301, and the operation of step 302 in accordance with each information for identifying the temporary management information.

Note that the information recording medium in each embodiment includes the user data area for recording user data, and the temporary management information area (TDMA).

The following detailed description assumes that logical overwrite is employed for the information recording medium of each embodiment, and a plurality of temporary management information (TDMS) are recorded in the temporary management information area (TDMA).

Embodiment 1

In Embodiment 1 of the present invention, information with which it is possible to identify the inconsistency flag clearing count is obtained, as information for identifying the temporary management information (TDMS) to be used, from outside the information reproduction device 100.

Figure 4:
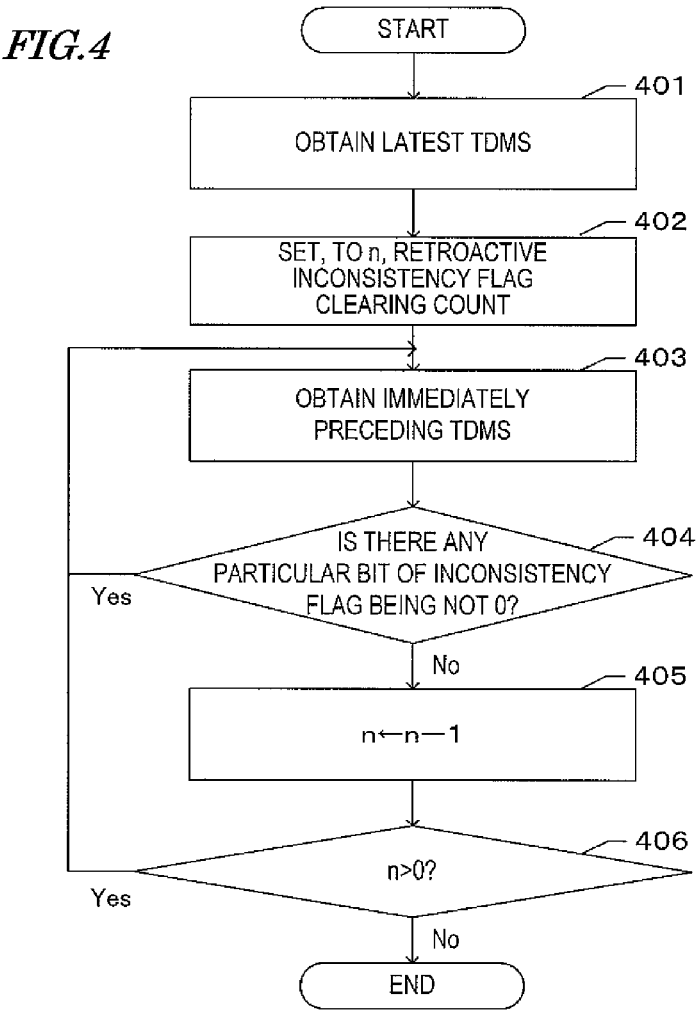
FIG. 4 A flow chart showing an operation of an information reproduction device according to Embodiment 1 of the present invention.

The operation of searching for and reproducing the target temporary management information from the temporary management information area of the information reproduction device 100 of Embodiment 1 will be described with reference to the flow chart of FIG. 4.

In step 401, the control searches for the recorded area end position of the TDMA of the information recording medium 101 and obtains the TDMS recorded at the recorded area end position. The TDMS at the recorded area end position is the latest TDMS.

In step 402, an inconsistency flag clearing count that is calculated from information with which it is possible to identify the inconsistency flag clearing count obtained from outside the information reproduction device 100 is set to variable n. The information with which it is possible to identify the inconsistency flag clearing count may be, for example, an inconsistency flag clearing count to be counted retroactively with respect to the latest TDMS. Alternatively, where a predetermined clearing count has been specified as the inconsistency flag clearing count and the search for the temporary management information has already been done, the information with which it is possible to identify the inconsistency flag clearing count may be information that indicates an increment/decrement with respect to the predetermined inconsistency flag clearing count previously specified.

In step 403, the control reproduces and obtains a TDMS immediately preceding the TDMS being held currently from the information recording medium 101.

In step 404, the control refers to the inconsistency flag of the TDDS included in the TDMS obtained in step 403 to determined whether particular bits have been all cleared. If any of the particular bits has not been cleared, the control returns to step 403, and if the particular bits have been all cleared, the control proceeds to step 405.

In step 405, the value of variable n is decremented by one.

In step 406, the control determines whether the value of variable n is greater than 0, and returns to step 403 if it is greater than 0 and ends the process if it is 0.

By reproducing the information recording medium 101 in accordance with the information of the TDMS being held at the time of completion of the above steps, it is possible to reproduce data using the temporary management information (TDMS) at a point in time when a particular bit of the inconsistency flag has been cleared a specified number of times retroactively.

Note that where a particular bit of the inconsistency flag is cleared when the information recording medium is ejected from the information recording/reproduction device, the clearing count for the particular bit of the inconsistency flag may be regarded as being information with which it is possible to identify the number of times the information recording medium has been ejected from the information recording/reproduction device.

As described above, with the information reproduction device and the information reproduction method of the present embodiment, temporary management information identifying information used for selecting a particular one of a plurality of temporary management information is received from outside the information reproduction device; one of the plurality of temporary management information that corresponds to the temporary management information identifying information is searched for and reproduced; and data of the user data area is reproduced in accordance with the reproduced temporary management information.

Here, the temporary management information includes information regarding the number of times the write-once information recording medium has been ejected. The temporary management information identifying information is information with which it is possible to identify the number of times the write-once information recording medium has been ejected.

Thus, it is possible to reproduce data using the temporary management information (TDMS) when the number of times the write-once information recording medium has been ejected is a predetermined number of times.

Moreover, with the information reproduction device and the information reproduction method of the present embodiment, the information regarding the eject count is the inconsistency flag. The inconsistency flag is information including a predetermined bit that is cleared when the write-once information recording medium is ejected from the information reproduction device. The information with which it is possible to identify the number of times the write-once information recording medium has been ejected is the information with which it is possible to identify the inconsistency flag clearing count.

Through a plurality of temporary management information, predetermined bits of the inconsistency flag are cleared sequentially starting from the latest temporary management information to older temporary management information. With the information reproduction device and the information reproduction method of the present embodiment, the control selectively searches for and reproduces one of a plurality of temporary management information that corresponds to the inconsistency flag clearing count obtained from the information with which it is possible to identify the inconsistency flag clearing count. Data of the user data area is reproduced in accordance with the reproduced temporary management information.

Thus, it is possible to reproduce data using the temporary management information (TDMS) when a particular bit of the inconsistency flag is cleared retroactively a specified number of times.

Embodiment 2

In Embodiment 2 of the present invention, information with which it is possible to identify the number of times the address of the block next available in each OPC area has changed is obtained, as information for identifying the temporary management information (TDMS) to be used, from outside the information reproduction device 100. An OPC area used for the adjustment of the recording power and the recording waveform of laser light is gradually consumed each time the information recording medium is loaded into the information recording/reproduction device. Therefore, the number of times the block address next available in the OPC area (the top address of the unused area where the OPC area is used in the address ascending order, and the bottom address of the unused area where the OPC area is used in the address descending order) has changed coincides with the number of times the information recording medium has been ejected from the information recording/reproduction device, and can be regarded as being information with which it is possible to identify the number of times the information recording medium has been ejected from the information recording/reproduction device.

Figure 5:
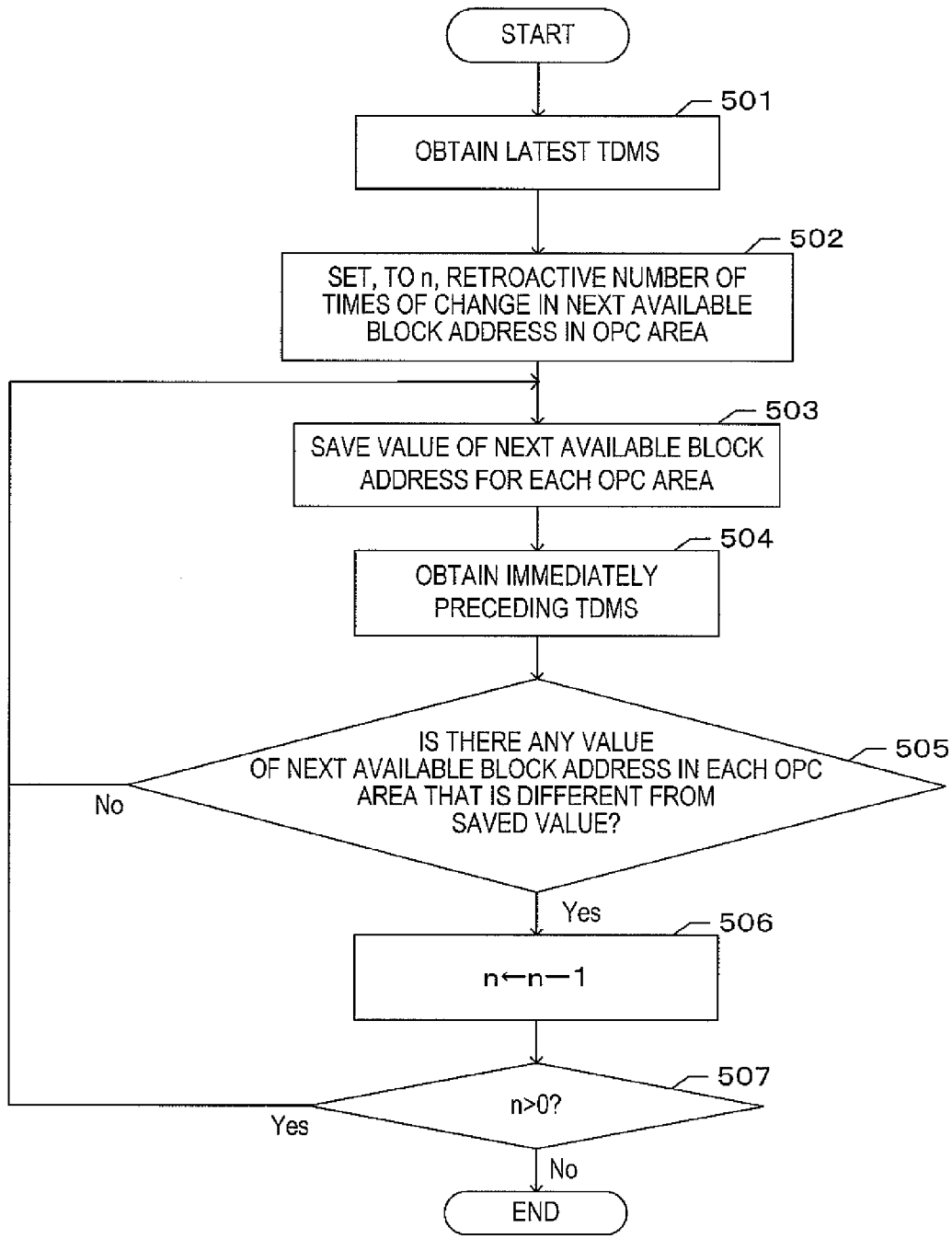
FIG. 5 A flow chart showing an operation of an information reproduction device according to Embodiment 2 of the present invention.

The operation of searching for and reproducing the target temporary management information from the temporary management information area of the information reproduction device 100 of Embodiment 2 will be described with reference to the flow chart of FIG. 5.

In step 501, the control searches for the recorded area end position of the TDMA of the information recording medium 101 and obtains the TDMS recorded at the recorded area end position. The TDMS at the recorded area end position is the latest TDMS.

In step 502, the number of times the block address next available in each OPC area has changed is set to variable n. The number of times of change to be set is calculated from information with which it is possible to identify the number of times the block address next available in each OPC area has changed obtained from outside the information reproduction device 100. The information with which it is possible to identify the number of times the block address next available has changed may be, for example, the number of times the block address next available has changed to be counted retroactively with respect to the latest TDMS. Alternatively, where a predetermined number of times of change has been specified as the number of times the block address next available has changed and the search for the temporary management information has already been done, the information with which it is possible to identify the number of times the block address next available has changed may be an increment/decrement with respect to the predetermined number of times of change previously specified.

In step 503, the value of the block address next available in each OPC area included in the TDMS being held is saved temporarily.

In step 504, the control reproduces and obtains a TDMS immediately preceding the TDMS being held currently from the information recording medium 101.

In step 505, the control determines whether the block address next available in each OPC area of the TDDS included in the TDMS obtained in step 504 coincides with the value temporarily saved in step 503. If they all coincide with the temporarily stored values, the control returns to step 503, and if there is any one that does not coincide with the temporarily stored value, the control proceeds to step 506.

In step 506, the value of variable n is decremented by one.

In step 507, the control determines whether the value of variable n is greater than 0, and returns to step 503 if it is greater than 0 and ends the process if it is 0.

By reproducing the information recording medium 101 in accordance with the information of the TDMS being held at the time of completion of the above steps, it is possible to reproduce data using the temporary management information (TOMS) before the block address next available in each OPC area has changed a specified number of times.

Embodiment 2 functions effectively in a case where the OPC area is used for the adjustment of the recording power and the recording waveform when the information recording medium is loaded into the information recording/reproduction device, and the number of times the block address next available of each OPC area has changed coincides with the number of times the information recording medium has been ejected from the information recording/reproduction device, and can be regarded as being information with which it is possible to identify the number of times the information recording medium has been ejected from the information recording/reproduction device.

Note that it will not coincide with the number of times the information recording medium has been ejected, in a case where nothing is recorded in the OPC area when the information recording medium is loaded into the information recording/reproduction device, or in a case where the OPC area is used a plurality of times with some time intervals therebetween since when the information recording medium is loaded into the information recording/reproduction device until it is ejected so that a plurality of temporary management information (TDMS) are recorded with different block addresses next available in each OPC area.

As described above, with the information reproduction device and the information reproduction method of the present embodiment, temporary management information identifying information used for selecting a particular one of a plurality of temporary management information is received from outside the information reproduction device; one of the plurality of temporary management information that corresponds to the temporary management information identifying information is searched for and reproduced; and data of the user data area is reproduced in accordance with the reproduced temporary management information.

Here, the temporary management information includes information regarding the number of times the write-once information recording medium has been ejected. The temporary management information identifying information is information with which it is possible to identify the number of times the write-once information recording medium has been ejected.

Thus, it is possible to reproduce data using the temporary management information (TDMS) when the number of times the write-once information recording medium has been ejected is a predetermined number of times.

Moreover, the write-once information recording medium of the present embodiment has one or more OPC area. The OPC area is an area used for the adjustment of the recording power or the recording waveform when the write-once information recording medium is loaded into the information reproduction device.

With the information reproduction device and the information reproduction method of the present embodiment, information regarding the number of times of ejection is the address of the block next available in each of one or more OPC area. The address of the block next available is information that is updated and changed when the OPC area is used. The information with which it is possible to identify the number of times the write-once information recording medium has been ejected is information with which it is possible to identify the number of times the address of the block next available in each of one or more OPC area has changed.

Through a plurality of temporary management information, the address of the block next available in each of one or more OPC area changes sequentially starting from the latest temporary management information to older temporary management information. With the information reproduction device and the information reproduction method of the present embodiment, the control selectively searches for and reproduces one of a plurality of temporary management information that corresponds to the number of times the address of the block next available in each of one or more OPC area has changed (as obtained from information with which it is possible to identify the number of times the address of the block next available in each of one or more OPC area has changed), and data of the user data area is reproduced in accordance with the reproduced temporary management information.

Thus, it is possible to reproduce data using the temporary management information (TOMS) before the block address next available has changed a specified number of times for each OPC area.

Embodiment 3

In Embodiment 3 of the present invention, information with which it is possible to identify the number of times the information recording/reproduction device has been exchanged is obtained, as information for identifying the temporary management information (TDMS) to be used, from outside the information reproduction device 100.

Figure 6:
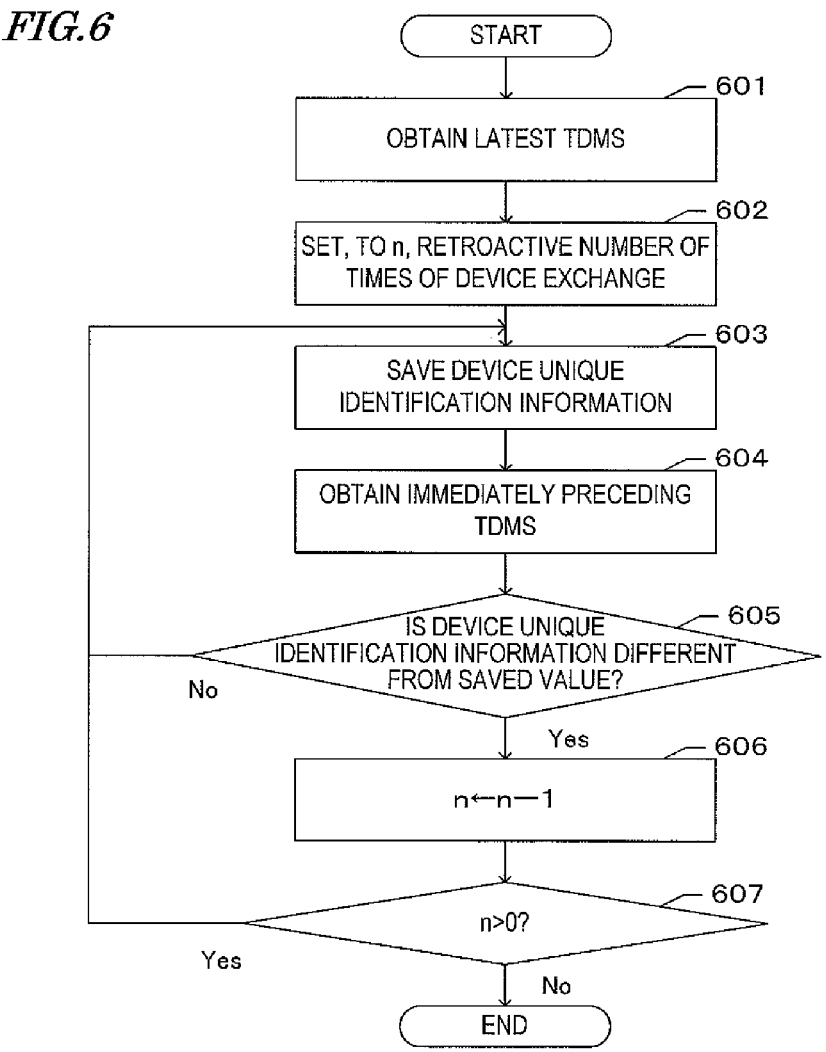
FIG. 6 A flow chart showing an operation of an information reproduction device according to Embodiment 3 of the present invention.

The operation of searching for and reproducing the target temporary management information from the temporary management information area of the information reproduction device 100 of Embodiment 3 will be described with reference to the flow chart of FIG. 6.

In step 601, the control searches for the recorded area end position of the TDMA of the information recording medium 101 and obtains the TDMS recorded at the recorded area end position. The TDMS at the recorded area end position is the latest TDMS.

In step 602, the number of times the information recording/reproduction device has been exchanged is set to variable n. The number of times the information recording/reproduction device has been exchanged is calculated from information with which it is possible to identify the number of times the information recording/reproduction device has been exchanged obtained from outside the information reproduction device 100. The information with which it is possible to identify the number of times the information recording/reproduction device has been exchanged may be, for example, the number of times the information recording/reproduction device has been exchanged to be counted retroactively with respect to the latest TDMS. Alternatively, where a predetermined number of times of exchange has been specified as the number of times the information recording/reproduction device has been exchanged and the search for the temporary management information has already been done, the information with which it is possible to identify the number of times the information recording/reproduction device has been exchanged may be an increment/decrement with respect to the predetermined number of times of exchange of the information recording/reproduction device previously specified.

In step 603, the device unique identification information of the TDDS included in the TDMS being held is saved temporarily.

In step 604, the control reproduces and obtains a TDMS immediately preceding the TDMS being held currently from the information recording medium 101.

In step 605, the control determines whether the device unique identification information of the TDDMS included in the TDMS obtained in step 604 coincides with the value temporarily saved in step 603. If it does, the control returns to step 603, and if it does not, the control proceeds to step 606.

In step 606, the value of variable n is decremented by one.

In step 607, the control determines whether the value of variable n is greater than 0, and returns to step 603 if it is greater than 0 and ends the process if it is 0.

By reproducing the information recording medium 101 in accordance with the information of the TDMS being held at the time of completion of the above steps, it is possible to reproduce data using the temporary management information (TDMS) before the information recording/reproduction device, in which the information recording medium is loaded, is exchanged a specified number of times.

As described above, with the information reproduction device and the information reproduction method of the present embodiment, temporary management information identifying information used for selecting a particular one of a plurality of temporary management information is received from outside the information reproduction device; one of the plurality of temporary management information that corresponds to the temporary management information identifying information is searched for and reproduced; and data of the user data area is reproduced in accordance with the reproduced temporary management information.

Moreover, with the information reproduction device and the information reproduction method of the present embodiment, the temporary management information includes device unique information. The device unique information is information for identifying the device which has recorded the temporary management information, for a plurality of temporary management information. The temporary management information identifying information is information with which it is possible to identify the number of times the information recording/reproduction device has been exchanged.

Where through a plurality of temporary management information, the device unique information changes sequentially starting from the latest temporary management information to older temporary management information, the information reproduction device and the information reproduction method of the present embodiment selectively search for and reproduce one of a plurality of temporary management information that corresponds to the number of times of exchange of the information recording/reproduction device (as obtained from the information with which it is possible to identify the number of times the information recording/reproduction device has been exchanged), and data of the user data area is reproduced in accordance with the reproduced temporary management information.

Thus, it is possible to reproduce data using the temporary management information (TDMS) before the information recording/reproduction device, in which the information recording medium is loaded, is exchanged a specified number of times.

Embodiment 4

In Embodiment 4 of the present invention, information with which it is possible to identify a date is obtained, as information for identifying the temporary management information (TDMS) to be used, from outside the information reproduction device 100. The information with which it is possible to identify a date may be a specific year/month/day. Alternatively, where a predetermined date has been specified and the search for the temporary management information has already been done, the information with which it is possible to identify a date may be a relative number of days with respect to the predetermined date previously specified.

Figure 7:
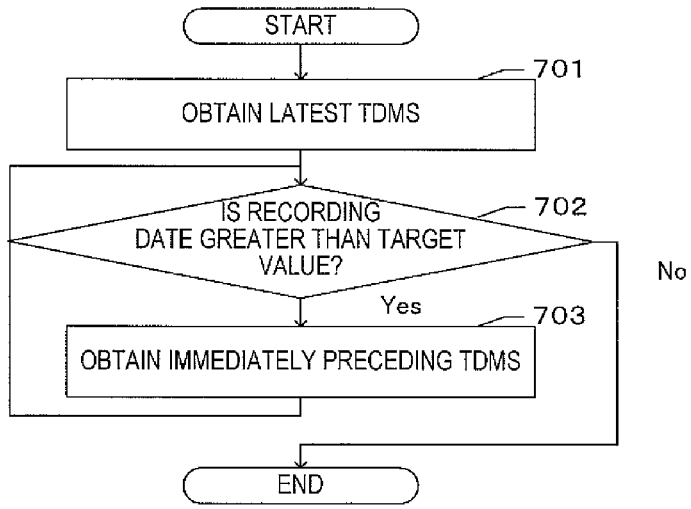
FIG. 7 A flow chart showing an operation of an information reproduction device according to Embodiment 4 of the present invention.

The operation of searching for and reproducing the target temporary management information from the temporary management information area of the information reproduction device 100 of Embodiment 4 will be described with reference to the flow chart of FIG. 7.

In step 701, the control searches for the recorded area end position of the TDMA of the information recording medium 101 and obtains the TDMS recorded at the recorded area end position. The TDMS at the recorded area end position is the latest TDMS.

In step 702, the control determines whether the recording date of the TDDS included in the TDMS being held is greater than the target date. Here, the TDDS recording date being greater than the target date means that the recording date is a later date than the target date, and the TDDS recording date being less than the target date means that the recording date is an earlier date than the target date. The control proceeds to step 703 if it is greater than the target date, and ends the process if it is equal to or prior to the target date.

In step 703, the control reproduces and obtains a TDMS immediately preceding the TDMS being held currently from the information recording medium 101, and returns to step 702.

The TDMS being held at the time of completion of the above steps can be identified as being temporary management information (TDMS) that was the latest as of the target date. By reproducing the information recording medium 101 in accordance with the information of the TDMS being held, it is possible to reproduce user data as of a specified date.

As described above, with the information reproduction device and the information reproduction method of the present embodiment, temporary management information identifying information used for selecting a particular one of a plurality of temporary management information is received from outside the information reproduction device; one of the plurality of temporary management information that corresponds to the temporary management information identifying information is searched for and reproduced; and data of the user data area is reproduced in accordance with the reproduced temporary management information.

Moreover, with the information reproduction device and the information reproduction method of the present embodiment, the temporary management information includes recording date information regarding the date on which the temporary management information was recorded. The temporary management information identifying information is information with which it is possible to identify a date.

Then, the information reproduction device and the information reproduction method of the present embodiment search for and reproduce the latest one of at least one temporary management information having recording date information indicating a date that is equal to or prior to the date obtained from the information with which it is possible to identify a date, and reproduce data of the user data area in accordance with the reproduced temporary management information.

More specifically, the write-once information recording medium of the present embodiment includes a user data area for recording user data and a temporary management information area for recording temporary management information. The temporary management information includes recording date information regarding the date on which the temporary management information was recorded. With the information reproduction device and the information reproduction method of the present embodiment, logical overwrite is employed for the write-once information recording medium, and the following operation is performed in a case where a plurality of temporary management information are recorded in the temporary management information area. First, information with which it is possible to identify a date is received from outside the information reproduction device. Then, the control searches for and reproduces the latest one of at least one temporary management information having recording date information indicating a date that is equal to or prior to the date indicated by the information with which it is possible to identify a date. Then, the control reproduces data of the user data area in accordance with the reproduced temporary management information.

Thus, it is possible to reproduce data using temporary management information (TDMS) that was the latest as of the specified date.

Embodiment 5

In Embodiment 5 of the present invention, as in Embodiment 4, information with which it is possible to identify a date is obtained, as information for identifying the temporary management information (TDMS) to be used, from outside the information reproduction device 100.

Figure 8:
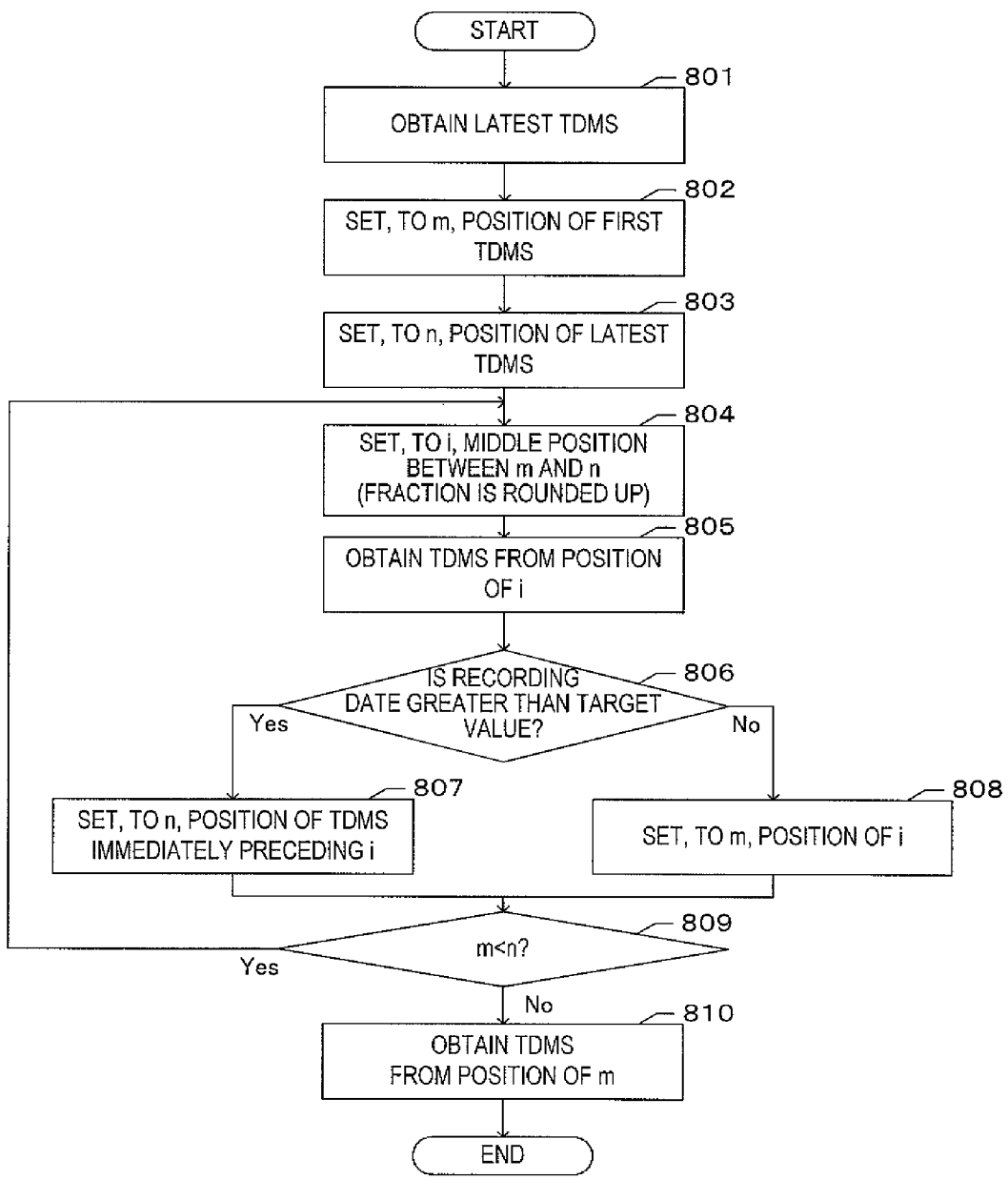
FIG. 8 A flow chart showing an operation of an information reproduction device according to Embodiment 5 of the present invention.

The operation of searching for and reproducing the target temporary management information from the temporary management information area of the information reproduction device 100 of Embodiment 5 will be described with reference to the flow chart of FIG. 8.

In step 801, the control searches for the recorded area end position of the TDMA of the information recording medium 101 and obtains the TDMS recorded at the recorded area end position. The TDMS at the recorded area end position is the latest TDMS.

In step 802, the position of the first TDMS at the beginning of the TDMA of the information recording medium 101 is set to variable m.

In step 803, the position of the latest TDMS obtained in step 801 is set to variable n.

In step 804, the middle position between m and n is set to variable i. Where there is a fraction, it is rounded up.

In step 805, the control reproduces and obtains the TDMS from the position of the information recording medium 101 indicated by variable i.

In step 806, the control determines whether the recording date of the TDDS included in the TDMS being held is greater than the target date. The control proceeds to step 807 if it is greater than the target date, and proceeds to step 808 if it is equal to or prior to the target date.

In step 807, the position of a TDMS immediately preceding the TDMS indicated by variable i is set to variable n.

In step 808, the position of the TDMS indicated by variable i is set to variable m.

In step 809, the control compares variable m with variable n, and returns to step 804 if m<n and proceeds to step 810 if m≧n.

In step 810, the process reproduces and obtains the TDMS from the position of the information recording medium 101 indicated by variable m, and ends the process.

By reproducing the information recording medium 101 in accordance with the information of the TOMS being held at the time of completion of the above steps, it is possible to reproduce data using the latest one of temporary management information (TDMS) of a specified date and dates prior to the specified date.

Embodiment 5 is a binary search for the target temporary management information (TDMS), and it is possible to more quickly find the target temporary management information (TDMS) than Embodiment 4.

Embodiment 6

In Embodiment 6 of the present invention, information with which it is possible to identify the address of the logical overwrite target block and information with which it is possible to identify the retroactive logical overwrite count for that block, as information for identifying the temporary management information (TDMS) to be used, from outside the information reproduction device 100.

Figure 9:
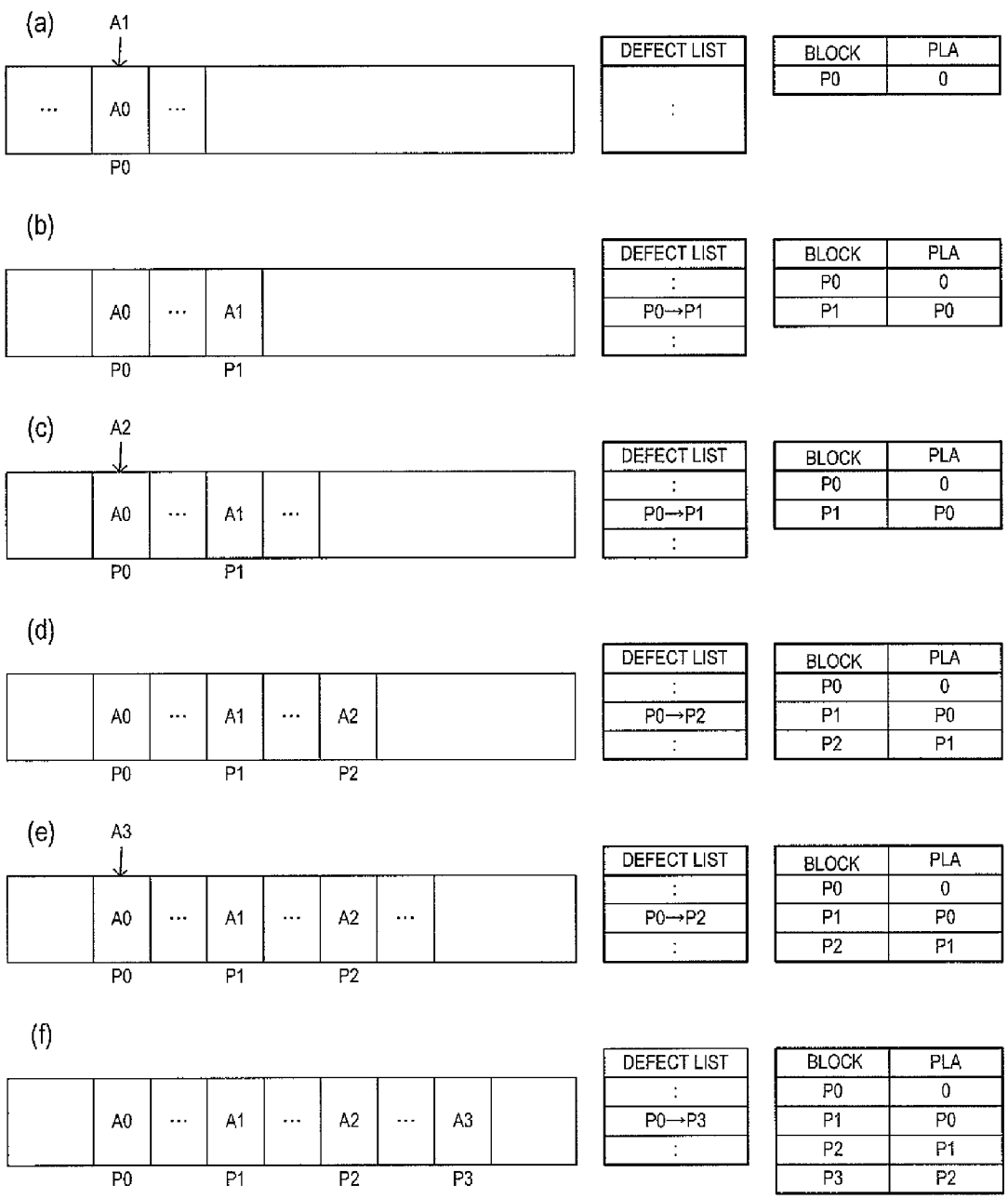
FIG. 9(a) to (f) are diagrams each showing an example of Previous Location Address in a BD-R.

FIG. 9 shows examples of PLA (Previous Location Address) to be recorded along with user data when logical overwrite is done on a BD-R.

In FIG. 9(*a*), data A0 is recorded in block P0. Block P0 has not been logically overwritten, and 0 is recorded as PLA in block P0.

FIG. 9(*b*) shows a state reached after block P0 of FIG. 9(*a*) is logically overwritten with data A1. In FIG. 9(*b*), data A1 is recorded in block P1 at the beginning of the unrecorded area, and an entry is added to the temporary defect list indicating that block P0 has been replaced with block P1. The address of block P0, where data of block P0 was recorded immediately before, is recorded as PLA in block P1.

FIG. 9(*d*) shows a state reached after block P0 is further logically overwritten with data A2 as shown in FIG. 9(*c*). In FIG. 9(*d*), data A2 is recorded in block P2 at the beginning of the unrecorded area. The "entry indicating that block P0 has been replaced with block P1" in the temporary defect list has been updated to an "entry indicating that block P0 has been replaced with block P2". The address of block P1, where data of block P0 was recorded immediately before, is recorded as PLA in block P2.

FIG. 9(*f*) shows a state reached after block P0 is further logically overwritten with data A3 as shown in FIG. 9(*e*). In FIG. 9(*f*), data A3 is recorded in block P3 at the beginning of the unrecorded area, and the "entry indicating that block P0 has been replaced with block P2" in the temporary defect list is updated to an entry indicating that "block P0 has been replaced with block P3". The address of block P2, where data of block P0 was recorded immediately before, is recorded as PLA in block P3.

Thus, if logical overwrite is performed on a BD-R, the address of the block (P0, P1 or P2) where the data of logically-overwritten block P0 was recorded is recorded as PLA in the new replacing block.

Figure 10:
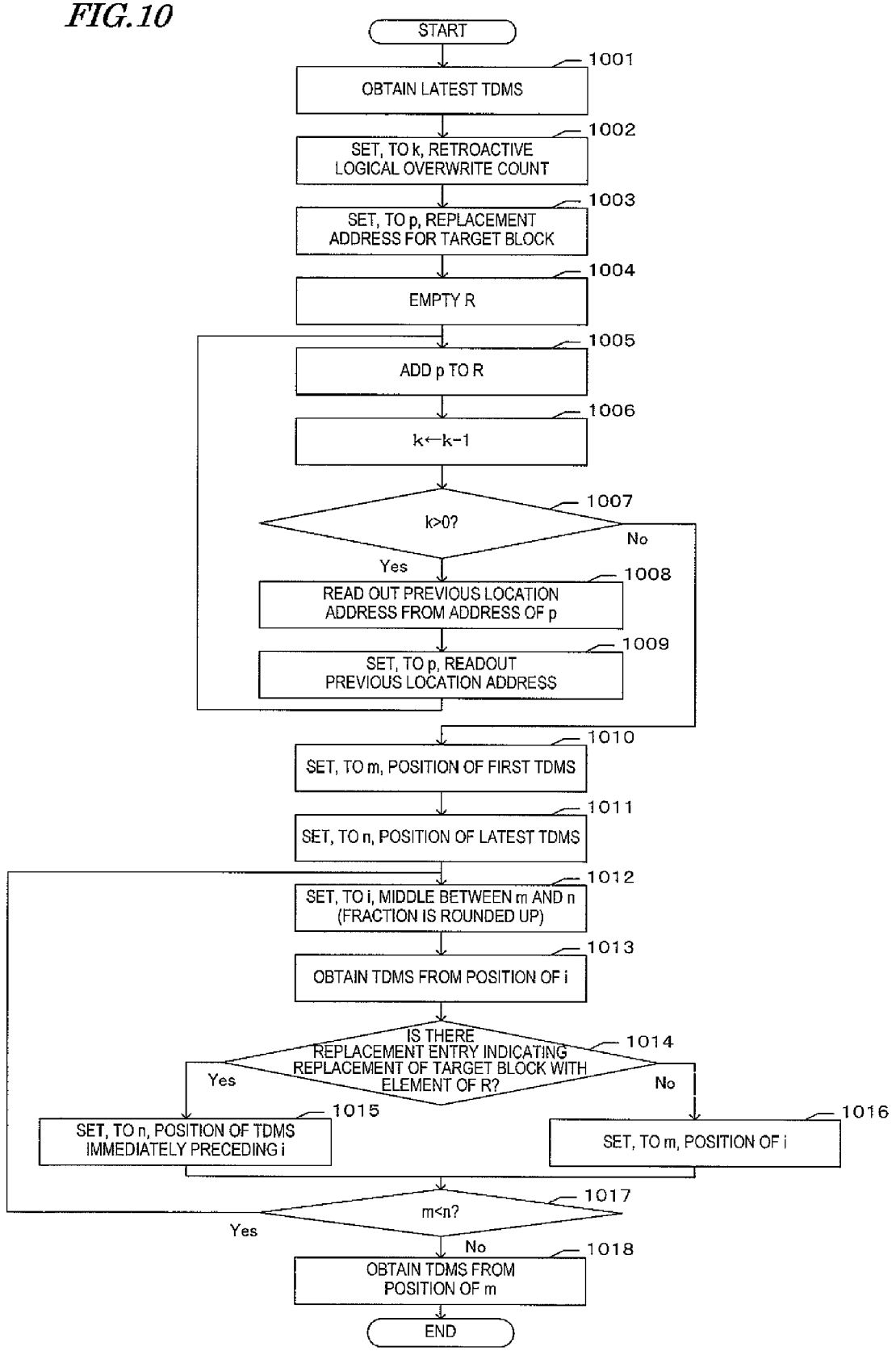
FIG. 10 A flow chart showing an operation of an information reproduction device according to Embodiment 6 of the present invention.

The operation of searching for and reproducing the target temporary management information from the temporary management information area of the information reproduction device 100 of Embodiment 6 will be described with reference to the flow chart of FIG. 10.

In step 1001, the control searches for the recorded area end position of the TDMA of the information recording medium 101 and obtains the TDMS recorded at the recorded area end position. The TDMS at the recorded area end position is the latest TDMS.

In step 1002, the retroactive logical overwrite count is set to variable k. The count to be set is calculated from information with which it is possible to identify the retroactive logical overwrite count, obtained from outside the information reproduction device 100. The information with which it is possible to identify the retroactive logical overwrite count may be, for example, the retroactive logical overwrite count with respect to the latest TDMS. Alternatively, where a predetermined number of times has been specified as the retroactive logical overwrite count and the search for the temporary management information has already been done, the information with which it is possible to identify the retroactive logical overwrite count may be an increment/decrement with respect to the predetermined retroactive logical overwrite count previously specified.

In step 1003, the control obtains, and sets to variable p, the address of the replacing block with which the logical overwrite target block has been replaced, as calculated from information with which it is possible to identify the address of the logical overwrite target block obtained from outside the information reproduction device 100, referring to the TDFL included in the latest TDMS obtained in step 1001. Note that an example of the address is the logical address where FE (file entry) is recorded. It is possible to obtain the FE logical address by interpreting the file system from a file specified by the user. Such an interpretation of the file system may be done by the file system driver of the host computer. The "information with which it is possible to identify the address of the logical overwrite target block" may be the logical address of the FE itself or a file specified by the user, or the address may be identified through interpretation of the file system done on the side of the information reproduction device.

In step 1004, set R is emptied. Assume that set R is a set having block addresses as elements thereof.

In step 1005, the value of variable p is added to set R.

In step 1006, the value of variable k is decremented by one.

In step 1007, it is determined whether the value of variable k is greater than 0, and the control proceeds to step 1008 if it is greater than 0 and proceeds to step 1010 if it is 0.

In step 1008, the control reads out the PLA from the block of the address indicated by variable p.

In step 1009, the value of the PLA read out in step 1004 is re-set to variable p, and the control returns to step 1005.

In step 1010, the position of the first TDMS at the beginning of the TDMA of the information recording medium 101 is set to variable m.

In step 1011, the position of the latest TDMS obtained in step 1001 is set to variable n.

In step 1012, the middle position between m and n is set to variable i. Where there is a fraction, it is rounded up.

In step 1013, the control reproduces and obtains the TDMS from the position of the information recording medium 101 indicated by variable i.

In step 1014, it is determined whether a replacement entry indicating that the logical overwrite target block has replaced with a block indicated by an element of set R exists in the TDFL included in the TDMS being held. The control proceeds to step 1015 if such a replacement entry exists, and proceeds to step 1016 if such a replacement entry does not exist.

In step 1015, the position of the TDMS immediately preceding the TDMS indicated by variable i is re-set to variable n.

In step 1016, the position of the TDMS indicated by variable i is re-set to variable m.

In step 1017, the control compares variable m with variable n, and returns to step 1012 if m<n, and proceeds to step 1018 if m≧n.

In step 1018, the control reproduces and obtains the TDMS from the position of the information recording medium 101 indicated by variable m, and ends the process.

By reproducing the information recording medium 101 in accordance with the information of the TDMS being held at the time of completion of the above steps, it is possible to reproduce data using the temporary management information (TDMS) before the specified logically-overwritten block is logically overwritten a specified number of times.

A specific example of a temporary management information search operation in Embodiment 6 will be described using FIG. 9 and FIG. 11.

Figure 11:
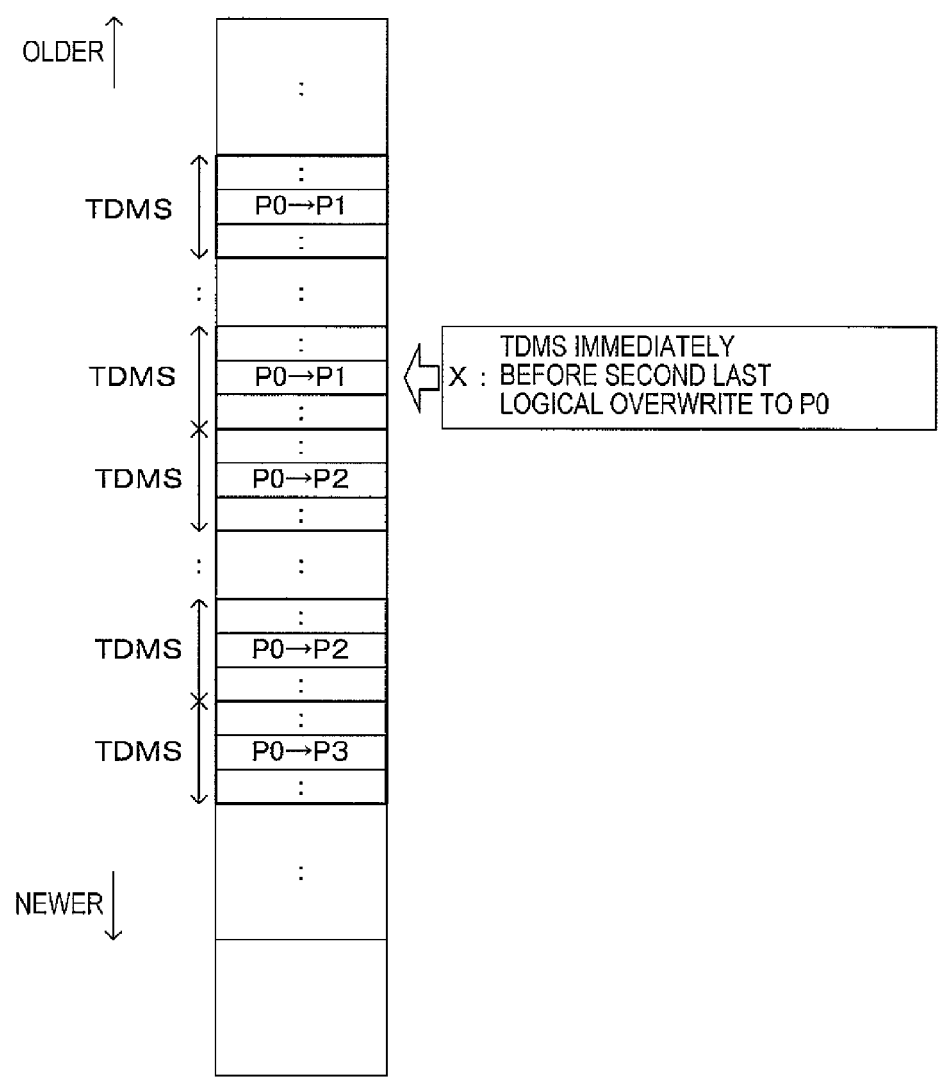
FIG. 11 A diagram showing an example of a search for temporary management information according to Embodiment 6 of the present invention.

The TDMS to be recorded in the TDMA when block P0 is logically overwritten as shown in FIG. 9 will be as shown in FIG. 11. In FIG. 11, the TDMS recorded while block P0 is replaced with block P1 includes a replacement entry indicating a replacement of block P0 with block P1. Similarly, the TDMS recorded while block P0 is replaced with block P2 includes a replacement entry indicting a replacement of block P0 with block P2, and the TDMS recorded while block P0 is replaced with block P3 includes a replacement entry indicating a replacement of block P0 with block P3.

For a hypothetical case where the control searches for a TDMS immediately before the second last logical overwrite to block P0, the control searches for the latest state in which block P0 has been replaced with block P1, i.e., the latest TDMS including a replacement entry indicating a replacement of block P0 with block P1. When this search is performed in accordance with the flow chart of FIG. 10, the condition of step 1007 does not hold, and set R upon proceeding to step 1010 will include P3 and P2. Then, by the binary search through step 1010 to step 1017, the control searches for the latest TDMS where there is no entry indicating a replacement of block P0 with block P3 or block P2. Thus, the position of the latest TDMS including a replacement entry (FIG. 9(b)) indicating a replacement of block P0 with block P1, denoted by X in FIG. 11, is set to variable m, and the target TDMS is obtained through step 1018.

As described above, with the information reproduction device and the information reproduction method of the present embodiment, temporary management information identifying information used for selecting a particular one of a plurality of temporary management information is received from outside the information reproduction device; one of the plurality of temporary management information that corresponds to the temporary management information identifying information is searched for and reproduced; and data of the user data area is reproduced in accordance with the reproduced temporary management information.

Moreover, in the present embodiment, the previous location address is recorded along with user data in each block of the user data area.

Moreover, with the information reproduction device and the information reproduction method of the present embodiment, the temporary management information includes a defect list. The temporary management information identifying information is information with which it is possible to identify the address and the logical overwrite count of the logical overwrite target block.

In the example shown in FIGS. 9 and 11, the information reproduction device and the information reproduction method of the present embodiment refer to the defect list of the latest one of a plurality of temporary management information so as to identify the replacing block (P3), which has replaced the logical overwrite target block (P0), and set the replacing block (P3) as being the current block. The operation of reproducing the previous location address (PLA) from the current block (P3) to thus obtain a new current block (P2) is repeated a number of times equal to the retroactive logical overwrite count, thereby identifying the target current block (P1). The control searches for and reproduces the latest one of a plurality of temporary management information in which a replacement entry exists in the defect list indicating a replacement of the logical overwrite target block (P0) with the target current block (P1), and reproduces data of the user data area in accordance with the reproduced temporary management information.

More specifically, the write-once information recording medium of the present embodiment includes a user data area for recording user data and a temporary management information area for recording temporary management information. The previous location address (PLA) is recorded along with user data in each block of the user data area. The temporary management information includes a defect list including a replacement entry.

In the example shown in FIGS. 9 and 11, the information reproduction device and the information reproduction method of the present embodiment perform the following operation in a case where logical overwrite is employed for the write-once information recording medium and a plurality of temporary management information are recorded in the temporary management information area. First, the control receives information with which it is possible to identify the address of the logical overwrite target block (P0) and information with which it is possible to identify the retroactive logical overwrite count from outside the information reproduction device. Then, the control refers to a replacement entry included in the defect list of the latest one of a plurality of temporary management information to identify the replacing block (P3) with which the logical overwrite target block (P0) has been replaced, and sets this block (P3) as the current block. Then, the operation of reproducing the previous location address (PLA) recorded in the current block (P3) and setting the block (P2) indicated by the previous location address (PLA) as the new current block is repeated a number of times equal to the retroactive logical overwrite count, thereby identifying the target current block (P1). Then, the control searches for and reproduces the latest one of temporary management information including a defect list that includes a replacement entry indicating a replacement of the logical overwrite target block (P0) with the target current block (P1). Then, the control reproduces data of the user data area in accordance with the reproduced temporary management information.

Thus, it is possible to reproduce data using the temporary management information (TDMS) at a point in time corresponding to a specified retroactive count.

The embodiments of the present invention described above can similarly be used for information recording/reproduction devices having the function of recording information on an information recording medium.

Figure 12:
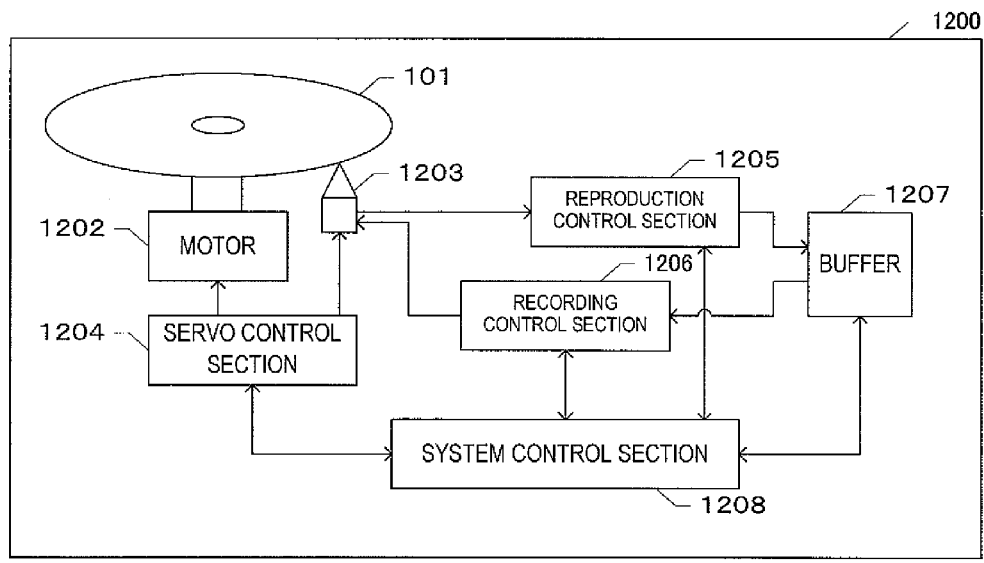
FIG. 12 A diagram showing a configuration of an information recording/reproduction device according to an embodiment of the present invention.
Figure 13:
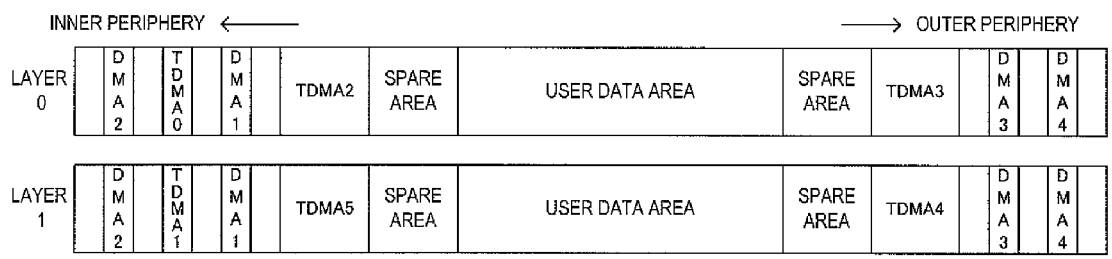
FIG. 13 A diagram showing a logical structure of a double-layer BD-R.
Figure 14:
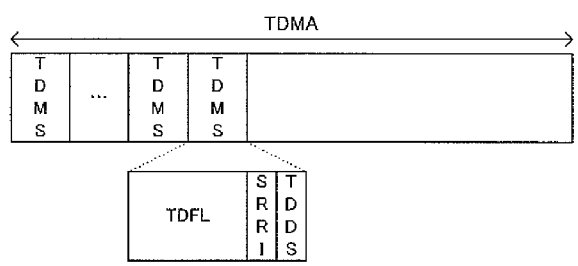
FIG. 14 A diagram showing a structure of a TDMA of a BD-R.
Figure 15:
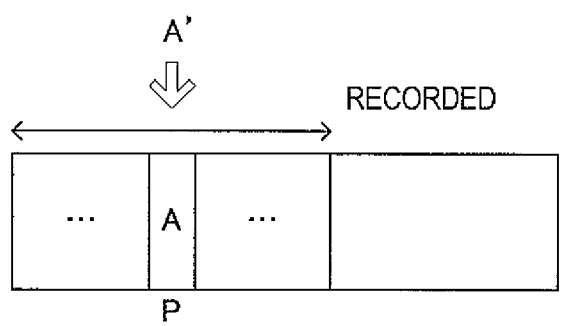
FIG. 15(a) and (b) are diagrams showing an example of an operation of logical overwrite.
Figure 15:
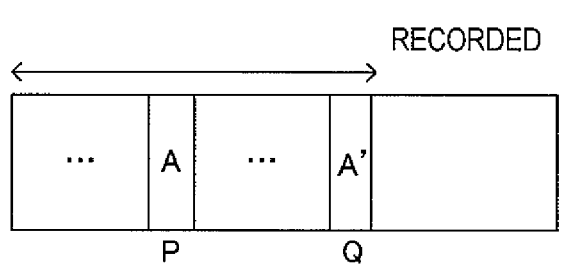

FIG. 12 is a block diagram showing an information recording/reproduction device 1200 according to an embodiment of the present invention.

In FIG. 12, a disc motor 1202 spins an information recording medium 101. An optical head 1203 functions as an irradiation section for irradiating a recording layer of the information recording medium 101 with a laser spot, and also as a recording section and a reproduction section for recording and reproducing data to/from the information recording medium 101. A servo control section 1204 performs the laser spot tracking process by moving the optical head 1203 to the target track while controlling the spin of the disc motor 1202. A reproduction control section 1205 demodulates the reproduce signal detected by the optical head 1203 to extract reproduce data therefrom, and stores the reproduce data in a buffer 1207. A recording control section 1206 modulates record data stored in the buffer 1207, and controls the optical head 1203 to record the data on the information recording medium 101. A system control section 1208 performs an overall control of the information recording/reproduction device 1200.

Where the present invention is used for an information recording/reproduction device, recording data while data is being reproduced using non-latest temporary management information (TDMS) will likely detract from the integrity of the temporary management information (TDMS). Therefore, it is preferred that recording on the information recording medium is prohibited while non-latest temporary management information (TDMS) is being used.

As described above, the information reproduction devices of Embodiments 1 to 6 may further include a recording section (1206, 1203) for recording information on a write-once information recording medium. Then, if the reproduced temporary management information is not the latest temporary management information recorded in the temporary management information area, recording on the write-once information recording medium may be prohibited. Thus, it is possible to prevent detraction from the integrity of the temporary management information (TDMS).

While specific embodiments of the present invention have been described above, it will be clear to a person of ordinary skill in the art that many other variations, modifications and other applications are included within the present invention. Thus, the present invention is not limited to the specific embodiments hereof but can only be limited by the appended claims.

INDUSTRIAL APPLICABILITY

According to the present invention, data is reproduced from a logically-overwritten information recording medium using the most suitable one of a plurality of temporary management information by a simple way of specification. Thus, it is possible to easily extract a past version of a file which has been logically overwritten. For example, the present invention is applicable to an external storage device of a host computer. The present invention is particularly useful in the technical field of optical discs.

REFERENCE SIGNS LIST

100 Information Reproduction Device
101 Information Recording Medium
102 Disc Motor
103 Optical Head
104 Servo Control Section
105 Reproduction Control Section
106 Buffer
107 System Control Section
1200 Information Recording/Reproduction Device
1202 Disc Motor
1203 Optical Head
1204 Servo Control Section
1205 Reproduction Control Section
1206 Recording Control Section
1207 Buffer
1208 System Control Section

The invention claimed is:

1. An information reproduction device for reproducing information from a write-once information recording medium, the write-once information recording medium including:
a user data area for recording user data; and
a temporary management information area for recording temporary management information, wherein:
the temporary management information includes recording date information regarding a date on which the temporary management information was recorded; and
where logical overwrite is employed for the write-once information recording medium and a plurality of temporary management information are recorded in the temporary management information area, the information reproduction device:
receives date identifying information with which it is possible to identify a date from outside the information reproduction device;
reproduces, from the temporary management information area, a latest one of at least one temporary management information including recording date information indicating a date that coincides with, or is prior to, the date indicated by the date identifying information; and
reproduces data of the user data area in accordance with the reproduced temporary management information.

2. The information reproduction device according to claim 1, wherein:
the information reproduction device includes a recording section for recording information on the write-once information recording medium; and
recording on the write-once information recording medium is prohibited when the reproduced temporary management information is not latest temporary management information recorded in the temporary management information area.

3. An information reproduction device for reproducing information from a write-once information recording medium, the write-once information recording medium including:
a user data area for recording user data; and
a temporary management information area for recording temporary management information, wherein:
a previous location address is recorded, along with user data, in each block of the user data area;
the temporary management information includes a defect list including a replacement entry; and
where logical overwrite is employed for the write-once information recording medium and a plurality of temporary management information are recorded in the temporary management information area, the information reproduction device:

receives information with which it is possible to identify an address of a logical overwrite target block and information with which it is possible to identify the retroactive logical overwrite count from outside the information reproduction device;

refers to a replacement entry included in the defect list of a latest one of the plurality of temporary management information to identify a replacing block with which the logical overwrite target block has been replaced, and sets the replacing block as a current block;

identifies a target current block by repeating, a number of times equal to the retroactive logical overwrite count, an operation of reproducing a previous location address recorded in the current block and setting a block indicated by the previous location address as a new current block;

searches for and reproduces a latest one of at least one temporary management information including a defect list including a replacement entry that indicates a replacement of the logical overwrite target block with the target current block; and reproduces data of the user data area in accordance with the reproduced temporary management information.

4. The information reproduction device according to claim 3, wherein:

the information reproduction device includes a recording section for recording information on the write-once information recording medium; and recording on the write-once information recording medium is prohibited when the reproduced temporary management information is not latest temporary management information recorded in the temporary management information area.

5. An information reproduction method for reproducing information from a write-once information recording medium, the write-once information recording medium including:

a user data area for recording user data; and a temporary management information area for recording temporary management information, wherein:

the temporary management information includes recording date information regarding a date on which the temporary management information was recorded; and where logical overwrite is employed for the write-once information recording medium and a plurality of temporary management information are recorded in the temporary management information area, the information reproduction method comprises the steps of:

receiving date identifying information with which it is possible to identify a date from outside an information reproduction device;

reproducing, from the temporary management information area, a latest one of at least one temporary management information including recording date information indicating a date that coincides with, or is prior to, the date indicated by the date identifying information; and reproducing data of the user data area in accordance with the reproduced temporary management information.

6. An information reproduction method for reproducing information from a write-once information recording medium, the write-once information recording medium including:

a user data area for recording user data; and a temporary management information area for recording temporary management information, wherein:

a previous location address is recorded, along with user data, in each block of the user data area;

the temporary management information includes a defect list including a replacement entry; and where logical overwrite is employed for the write-once information recording medium and a plurality of temporary management information are recorded in the temporary management information area, the information reproduction method comprises the steps of:

receiving information with which it is possible to identify an address of a logical overwrite target block and information with which it is possible to identify the retroactive logical overwrite count from outside an information reproduction device;

referring to a replacement entry included in the defect list of a latest one of the plurality of temporary management information to identify a replacing block with which the logical overwrite target block has been replaced, and setting the replacing block as a current block;

identifying a target current block by repeating, a number of times equal to the retroactive logical overwrite count, an operation of reproducing a previous location address recorded in the current block and setting a block indicated by the previous location address as a new current block;

searching for and reproducing a latest one of at least one temporary management information including a defect list including a replacement entry that indicates a replacement of the logical overwrite target block with the target current block; and reproducing data of the user data area in accordance with the reproduced temporary management information.

* * * * *

UNITED STATES PATENT AND TRADEMARK OFFICE
CERTIFICATE OF CORRECTION

PATENT NO. : 8,358,567 B2
APPLICATION NO. : 13/576260
DATED : January 22, 2013
INVENTOR(S) : Yoshikazu Yamamoto and Motoshi Ito It is certified that error appears in the above-identified patent and that said Letters Patent is hereby corrected as shown below:

On the Title Page, Item (56), under "OTHER PUBLICATIONS"
"Form PCT/USA/237" should read "Form PCT/ISA/237"

Signed and Sealed this
Fifteenth Day of October, 2013

Teresa Stanek Rea
*Deputy Director of the United States Patent and Trademark Office*